(12) United States Patent
Kesterson

(10) Patent No.: US 10,250,046 B2
(45) Date of Patent: Apr. 2, 2019

(54) ELECTROMAGNETIC INTERFERENCE BLOCKING SYSTEM

(71) Applicant: Dialog Semiconductor Inc., Campbell, CA (US)

(72) Inventor: John Kesterson, Seaside, CA (US)

(73) Assignee: Dialog Semiconductor, Inc., Campbell, CA (US)

( * ) Notice: Subject to any disclaimer, the term of this patent is extended or adjusted under 35 U.S.C. 154(b) by 311 days.

(21) Appl. No.: 15/251,651

(22) Filed: Aug. 30, 2016

(65) Prior Publication Data

US 2018/0062404 A1     Mar. 1, 2018

(51) Int. Cl.
*H02J 7/00* (2006.01)
*H02M 1/44* (2007.01)
*H02M 7/06* (2006.01)
*H02M 7/217* (2006.01)

(52) U.S. Cl.
CPC ............ *H02J 7/0026* (2013.01); *H02J 7/007* (2013.01); *H02M 1/44* (2013.01); *H02M 7/06* (2013.01); *H02M 7/2176* (2013.01)

(58) Field of Classification Search
CPC .......... H02J 7/0026; H02J 7/007; H02M 1/44; H02M 7/06; H02M 7/2176

USPC ....................................................... 320/130
See application file for complete search history.

(56) References Cited

U.S. PATENT DOCUMENTS 6,326,772 B2 * 12/2001 Kusumoto ............ H02M 3/155
  307/109
6,765,774 B2 * 7/2004 Telefus ................... H02H 9/005
  361/58
2018/0041210 A1 * 2/2018 Pu ............................ H02J 50/10

* cited by examiner

*Primary Examiner* — Nathaniel R Pelton
(74) *Attorney, Agent, or Firm* — Saile Ackerman LLC; Stephen B. Ackerman

(57) ABSTRACT

An apparatus and method for blocking electromagnetic interference, EMI is presented. In particular, the present invention relates to a switched mode power supply provided with an electromagnetic interference protection circuit with low power dissipation. There is provided an adiabatically-switched electromagnetic interference protection circuit. The protection circuit contains a first charge storage element and a second charge storage element. A switching regulator operates with a switching cycle having an on-time and an off-time; and the control signal is arranged to cause a transition between the first mode and the second mode to start during the off-time of a switching cycle of the switching regulator.

20 Claims, 6 Drawing Sheets

ELECTROMAGNETIC INTERFERENCE BLOCKING SYSTEM

TECHNICAL FIELD

The present disclosure relates to apparatus and methods for blocking electromagnetic interference, EMI. In particular, the present invention relates to a switched mode power supply provided with an electromagnetic interference protection circuit with low power dissipation.

BACKGROUND

Switched-mode power supplies are commonly used for applications requiring high power conversion efficiency and small footprint. However, switched-mode power supplies tend to be noisier than linear converters.

One solution presented in U.S. Pat. No. 6,765,774 is to provide the switched-mode power supply with a high impedance system for blocking electromagnetic interferences. In this case a switch is used for isolating the power source from interferences produced by the load. However, by doing so the switched-mode power supply loses efficiency through power dissipation.

SUMMARY

It is an object of the invention to address one or more of the above mentioned limitations. According to a first aspect of the disclosure, there is provided an adiabatically-switched electromagnetic interference protection circuit.

Optionally, the protection circuit comprises a first charge storage element and a second charge storage element, the first and second charge storage elements being provided between an input for receiving a rectified input voltage and an output for connecting to a switching regulator; wherein the protection circuit is selectively operable between a first mode in which the first charge storage element is coupled to the input and de-coupled from the output; a second mode in which the second charge storage element is coupled to the input and de-coupled from the output; and a third mode in which the first charge storage element and the second charge storage element are each de-coupled from both the input and the output and a controller adapted to output a control signal to switch the protection circuit between the first mode and the second mode via the third mode; wherein the control signal is adapted to maintain the protection circuit in the third mode for a delay-time.

Optionally, the switching regulator is configured to operate with a switching cycle having an on-time and an off-time; and the control signal is arranged to cause a transition between the first mode and the second mode to start during the off-time of a switching cycle of the switching regulator.

Optionally, the control signal is arranged to cause a transition between the first mode and the second mode to start during a period of time when the rectified input voltage is increasing.

Optionally, the control signal comprises a plurality of logic signals.

Optionally, the protection circuit comprises a first pair of switches coupled to the first and second charge storage elements and a second pair of switches coupled to the first and second charge storage elements.

Optionally, the control signal comprises a first logic signal adapted to operate the first pair of switches and a second logic signal adapted to operate the second pair of switches.

Optionally, the first pair of switches comprises a first switch coupled between the input of the protection circuit and the first charge storage element; and a second switch coupled between the second charge storage element and the output of the protection circuit; and the second pair of switches comprises a third switch coupled between the input of the protection circuit and the second charge storage element; and a fourth switch coupled between the first charge storage element and the output of the protection circuit.

Optionally, the controller comprises a time-delay circuit coupled to a plurality of logic gates.

Optionally, the delay-time ranges for from about 0.5 microsecond to about 1 microsecond.

According to a second aspect of the disclosure there is provided a converter circuit comprising a rectifier for providing a rectified input voltage, a switching regulator comprising a power switch; and an adiabatically-switched electromagnetic interference protection circuit coupled to the rectifier and to the switching regulator.

Optionally, the protection circuit comprises a first charge storage element and a second charge storage element, the first and second charge storage elements being provided between an input for receiving the rectified input voltage and an output for connecting to the switching regulator; wherein the protection circuit is selectively operable between a first mode in which the first charge storage element is coupled to the input and de-coupled from the output; a second mode in which the second charge storage element is coupled to the input and de-coupled from the output; and a third mode in which the first charge storage element and the second charge storage element are each de-coupled from both the input and the output and a controller adapted to output a control signal to switch the protection circuit between the first mode and the second mode via the third mode; wherein the control signal is adapted to maintain the protection circuit in the third mode for a delay-time.

Optionally, the rectifier comprises at least two switches.

Optionally, the protection circuit comprises a first pair of switches coupled to the first and second charge storage elements and a second pair of switches coupled to the first and second charge storage elements; and wherein one switch among the first and second pair of switches is the power switch of the switching regulator.

According to a third aspect of the disclosure, there is provided an electromagnetic interferences protection method comprising providing an adiabatically-switched electromagnetic interference protection circuit comprising a first charge storage element and a second charge storage element between an input for receiving a rectified input voltage and an output for connecting to a switching regulator; wherein the protection circuit is selectively operable between a first mode in which the first charge storage element is coupled to the input and de-coupled from the output; a second mode in which the second charge storage element is coupled to the input and de-coupled from the output; and a third mode in which the first charge storage element and the second charge storage element are each de-coupled from both the input and the output; and switching the protection circuit between the first mode and the second mode via the third mode by maintaining the protection circuit in the third mode for a delay-time.

Optionally, the switching regulator is configured to operate with a switching cycle having an on-time and an off-time; and switching the protection circuit between the first state and the second state is performed during the off-time of a switching cycle of the switching regulator.

Optionally, switching the protection circuit between the first mode and the second mode starts during a period of time when the rectified input voltage is increasing.

Optionally, the method comprises charging the first charge storage element in the first mode and discharging the first charge storage element in the second mode.

Optionally, the method comprises charging the second charge storage element in the second mode and discharging the second charge storage element in the first mode.

Optionally, charging the storage element is started when the rectified input voltage reaches a value equal to the voltage across the capacitor.

Optionally, the method comprises proving a first pair of switches coupled to the first and second charge storage elements and a second pair of switches coupled to the first and second charge storage elements.

Optionally, the method comprises generating a first logic signal to control the first pair of switches and generating a second logic signal to control the second pair of switches.

BRIEF DESCRIPTION OF THE DRAWINGS

The invention is described in further detail below by way of example and with reference to the accompanying drawings, in which.

DESCRIPTION

Figure 1:
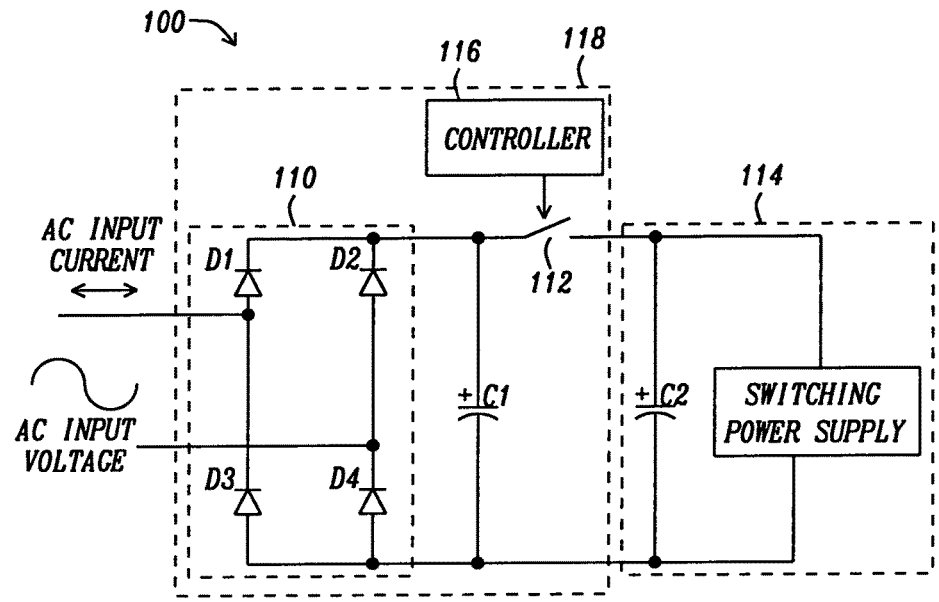
FIG. 1 is a circuit diagram comprising a system for blocking EMI according to the prior art.

FIG. 1 illustrates a power circuit 100, as described in U.S. Pat. No. 6,765,774. The circuit 100 is provided with a high impedance system 118 inserted between a AC input voltage and a load 114. The high impedance system 118 comprises a rectifier 110 formed by four diodes D1, D2, D3 and D4, a capacitor C1, a switch 112 and a controller 116 for controlling the switch 112. The load 114 includes another capacitor C2 connected in parallel with a switching power supply.

Figure 2:
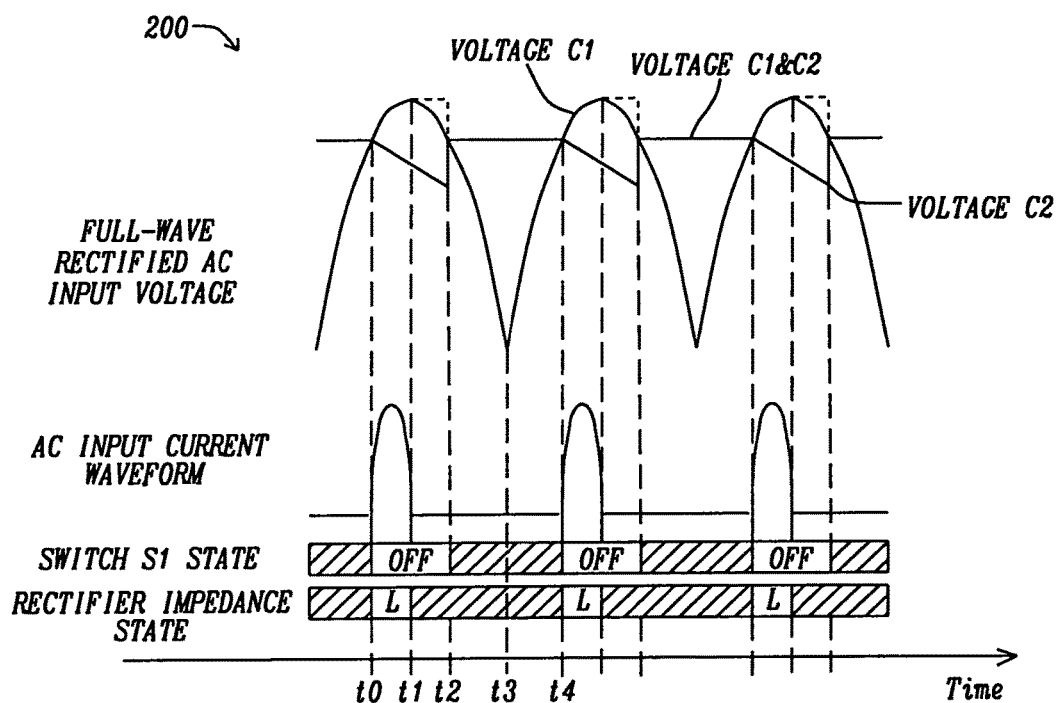
FIG. 2 is a timing chart illustrating the working of the circuit of FIG. 1.

FIG. 2 illustrates the full wave rectified AC input voltage; the AC input current waveform, the state of switch 112 and the impedance state of the rectifier of FIG. 1.

At t=t0, the switch 112 is turned off (open). At this point the capacitor C1 charges, and the switching power converter load is powered from the capacitor C2.

At t=t1, the voltage of C1 reaches its maximum value.

At t=t2, the voltage across the capacitor C2 reaches a minimum threshold value, at which point the switch 112 is turned ON (closed). When switch 112 is turned ON, a voltage of the capacitors C1 and C2 changes to the input line voltage. Even though the switch 112 stays on, the switching noise caused by the switching load does not get communicated back to the input line. This is because the voltage on the bulk capacitor is larger than the input voltage. The charge on the capacitor is such that the diodes D1, D2, D3 and D4 are reverse biased, corresponding to a high impedance state of the rectifier. Therefore, at this point, there is no current from the input line.

Between t2 and t3 the switching power converter is powered from both C1 and C2.

However, the method of the prior art is limited in that when the switch 112 turns on at time t=t2, the capacitors C1 and C2 are suddenly connected in parallel, resulting in a loss of energy. Since C1 and C2 are charged to a different voltage, charges will flow between C1 and C2. In addition, at time t=t2, C1 is discharging a small amount of current to the source while C2 is charging from the source to the source level. As a results, there is a large spike of current coming from the line. Part of this current is dissipated in the equivalent series resistance, ESR, of the capacitor and in the forward biased diode. The current through C1 and C2 at this point is only limited to the ESR of the capacitors. Therefore, energy loss comes from the input line and results in a loss of efficiency.

Figure 3:
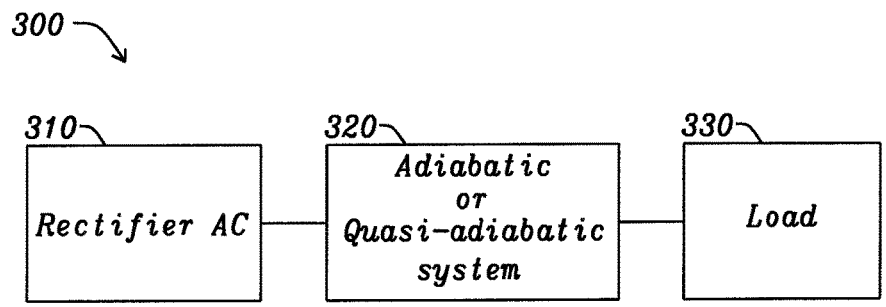
FIG. 3 is a diagram of a power converter system provided with an adiabatic EMI blocking system.

FIG. 3 shows a block diagram of a power circuit adapted to block EMI interferences that includes an adiabatic or a quasi-adiabatic system 320 provided between a rectifier 310 and a load 330. The adiabatic or quasi-adiabatic system 320 allows EMI produced by the switching regulator load to be blocked without dissipating energy within the system.

Figure 4:
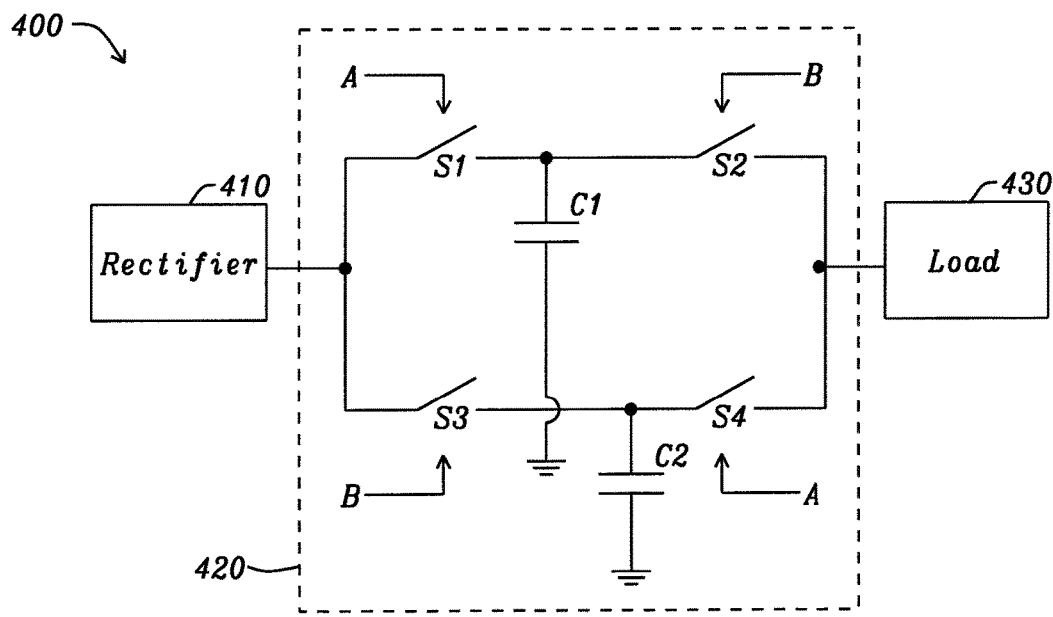
FIG. 4 is a circuit diagram of the adiabatic isolation section of FIG. 3.

FIG. 4 illustrates a possible implementation of an adiabatic system 420. In this example, the adiabatic circuit has two charge storage elements, for example two capacitors, provided between an input for receiving an output of the rectifier 410 and an output for connecting to a load 430. The rectifier may be a full wave bridge rectifier formed by four diodes. The load may be a switching converter such as a buck or a buck-boost converter. The adiabatic circuit 420 includes two arms, each extending between the input and the output. The first arm is provided with switches S1 and S2, and the second arm is provided with switches S3 and S4. A first capacitor C1 has a first terminal coupled to the input via the switch S1 and to the output via switch S2. A second terminal of the capacitor C1 is connected to the ground. A second capacitor C2 has a first terminal coupled to the input via switch S3 and to the output via switch S4. A second terminal of the capacitor C2 is connected to the ground. The capacitors C1 and C2 are also referred to as bulk capacitors. A controller, not shown, is adapted to generate logic signals A and B for operating switches S1, S4 and S2, S3 respectively.

Figure 5:
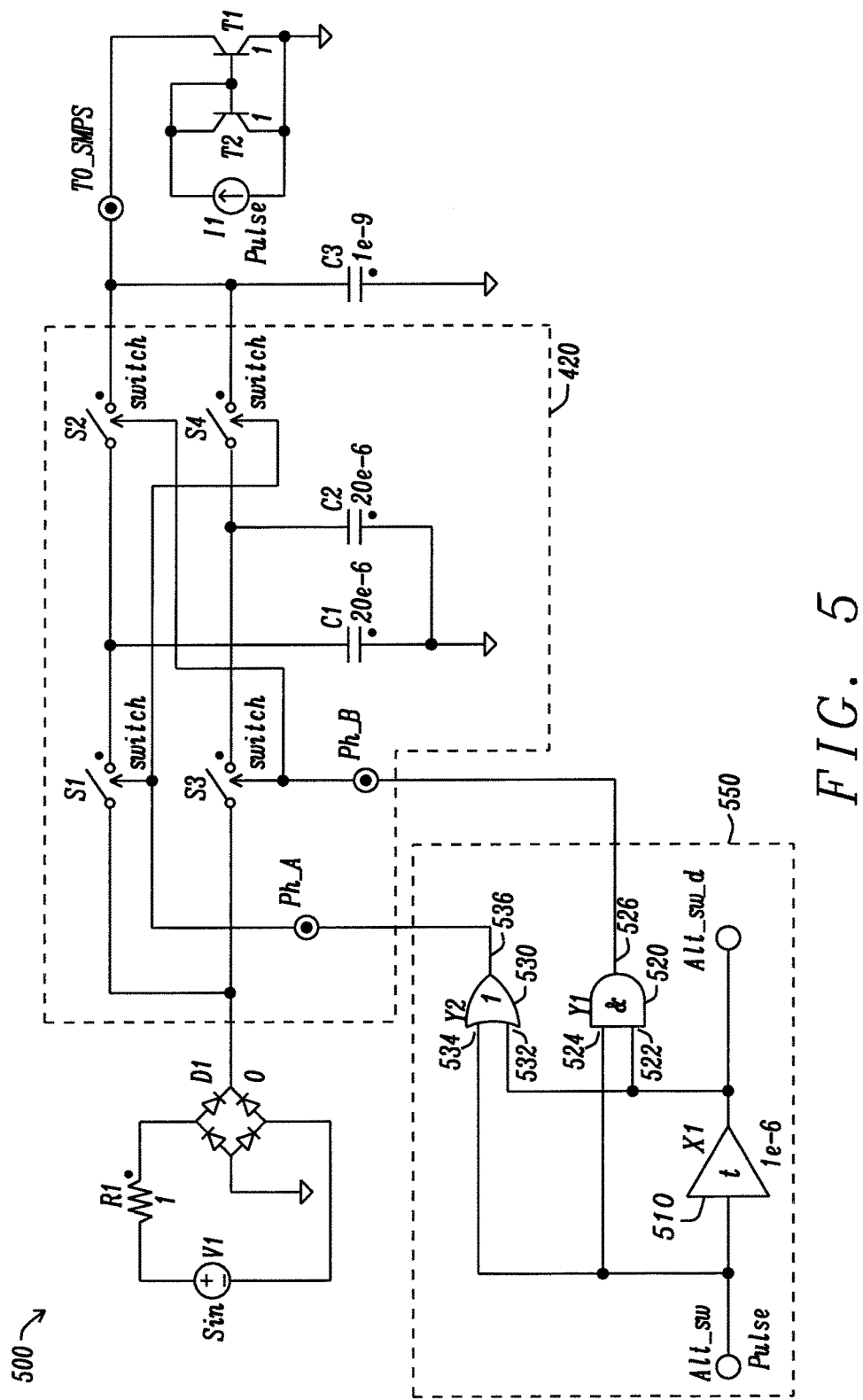
FIG. 5 is a simulation circuit diagram of a switching load sourced with an EMI blocking system.

FIG. 5 shows a simulation circuit for the circuit of FIG. 4. In this example the rectifier is provided by a full wave bride rectifier connected to an input line for providing an AC input signal. The load is provided by a buck-boost converter such as a flyback converter. A switching current of the flyback converter is modeled by a current generator I1 and a current mirror formed by transistors T1 and T2.

In order to facilitate the simulation an additional capacitor C3 is connected in parallel at the output of the adiabatic circuit 420. The capacitor C3 has a capacitance about four orders of magnitude smaller than the capacitance of the bulk capacitors C1 and C2. This capacitor is therefore optional and could be used to help remove non-adiabatic losses.

A controller 550 includes an input for receiving a logic signal and two outputs for dispensing a pair of non-overlapping logic signals Ph_A and Ph_B. A signal generator, not shown, generates a logic signal, Alt_Sw, designed to switch between a high value, such as a logic one, and a low value, such as a logic 0 every ½ cycle of the AC input line. A time delay circuit 510 is provided at the controller's input. The delay circuit 510 is coupled to an AND gate 520 and to an OR gate 530. The AND gate 520 has a first input 522, a second input 524 and one output 526. The OR gate 530 has a first input 532, a second input 534 and one output 536. The logic signal Alt_Sw is provided at the delay circuit 510 and at the inputs 524 and 534 of the AND and OR gates. A delayed logic signal is provided at the inputs 522 and 532 of the AND and OR gates.

Figure 6:
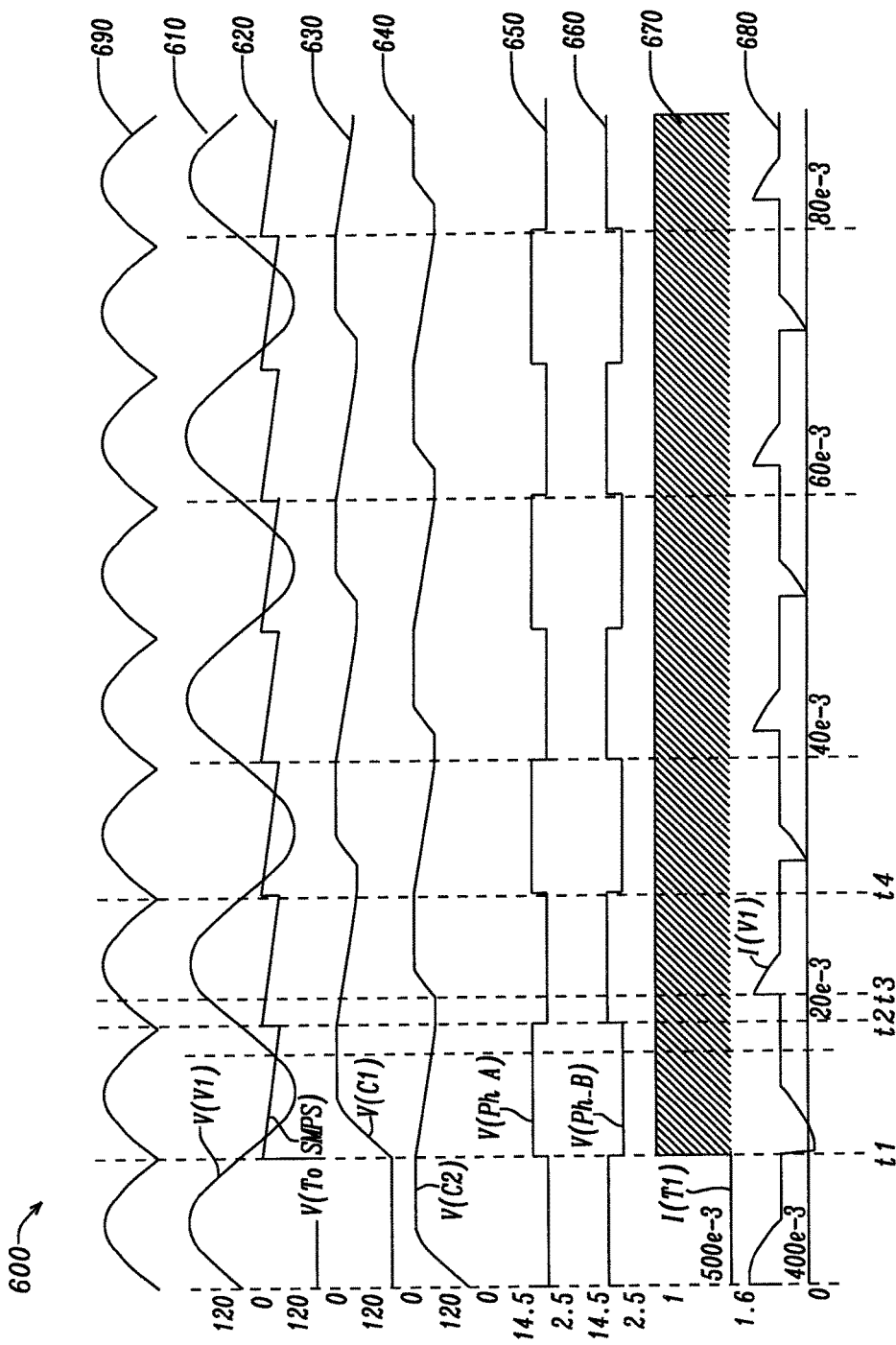
FIG. 6 is a timing chart illustrating the working of the circuit of FIG. 5.

FIG. 6 illustrates a timing chart that includes the profiles of an input AC voltage 610, an output voltage 620 of the adiabatic system, a capacitor voltage 630 across C1, a capacitor voltage 640 across C2, a logic signal Ph_A 650, a logic signal Ph_B 660, a switching current signal 670 of the switching regulator, an input current signal 680 across the input line, and a rectified input voltage 690 of the input AC voltage 610.

Figure 7:
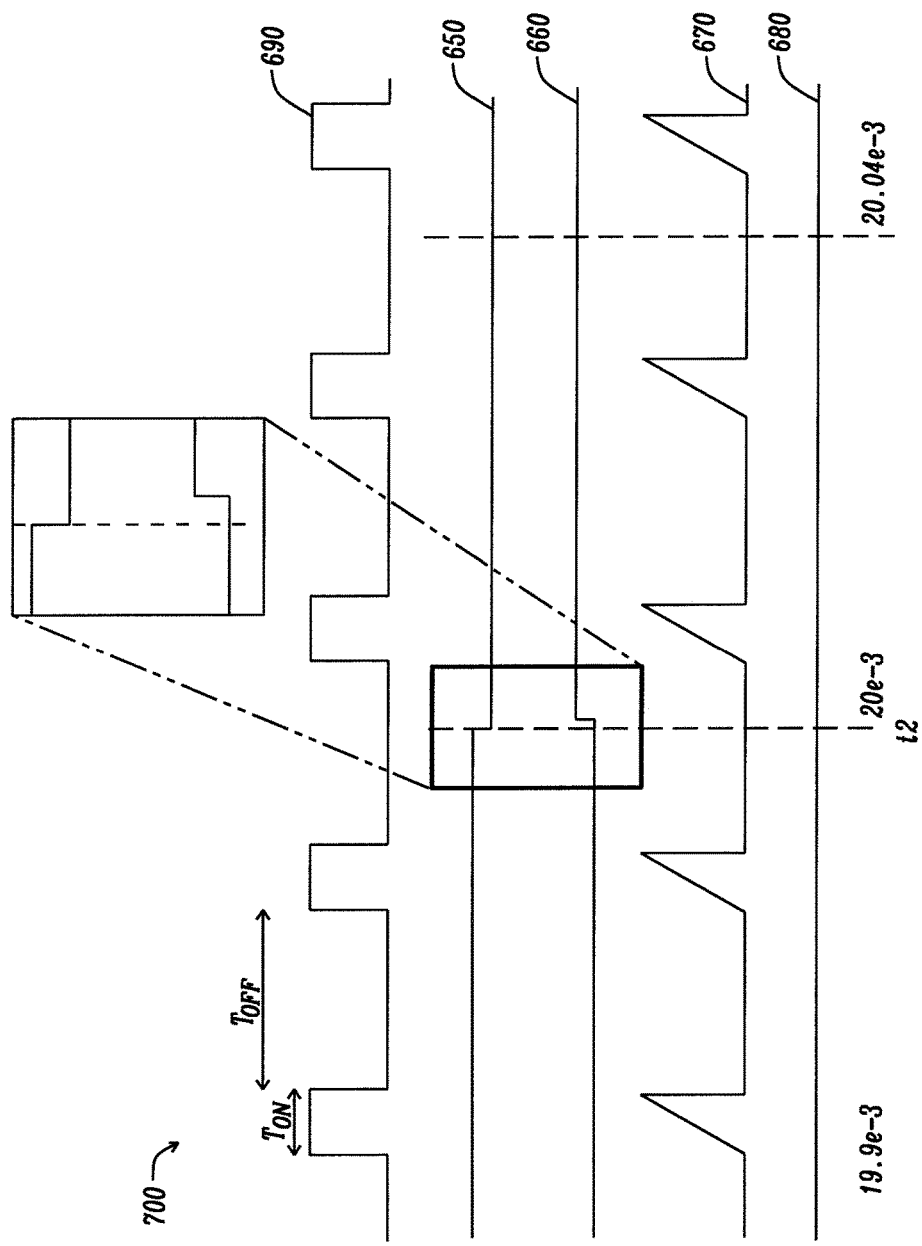
FIG. 7 is a close-up view of the timing chart of FIG. 6.

FIG. 7 shows the logic signals 650 and 660, the switching current signal 670 and the input current signal 680, across a time window of approximately 80 µs. FIG. 7 also shows the switching cycle profile 690 of the switching regulator. The switching cycle has a series of pulses corresponding to the ON time $T_{ON}$ of the power switch of the switching regulator. Two consecutive pulses are separated by an OFF time $T_{OFF}$. The ON time $T_{ON}$ of the power switch occurs every 20 µs. This corresponds to an operation frequency of the flyback converter of 50 KHz. A train of current pulses from the switching regulator can be observed on the signal 670.

The adiabatic protection circuit is selectively operable between three modes. In the first mode the capacitor C1 is coupled to the input and de-coupled from the output. In the second mode, the second capacitor C2 is coupled to the input and de-coupled from the output. In the third mode, C1 and C2 are each de-coupled from both the input and the output. Switching between the first mode and the second mode is performed via the third mode.

The switches S1 and S4 are operated by logic signal Ph_A 650 and the switches S2 and S3 are operated by logic signal Ph_B 660. Operation will now be described with reference to FIGS. 6 and 7 by considering a full cycle between times t1 and t4.

At time t=t1, the logic signal Ph_A turns high, for example from a logic 0 to a logic 1. The switches S1 and S4 are turned on (closed). The logic signal Ph_B turns low, for example from a logic 1 to a logic 0. The switches S2 and S3 are turned off (open). The adiabatic protection circuit is in the first mode.

Between time t=t1 and t=t2, the capacitor C1 is being charged by the AC input line through the rectifier, and the switching regulator is driven by capacitor C2. Signals 630 and 640 show the charge of C1 and discharge of C2. In this example it can be observed that C1 reach full charge before time t2.

Capacitor C1 is charged by connecting it to the input line through the rectifier. The connection is performed at a point in time when the rectified input voltage 690 is increasing, before the rectified input voltage reaches a value equal to the voltage across C1. Before t=t1, the four diodes of the rectifier are reversed biased. Therefore, there is no current flowing from the input line before the input line has reached the voltage across the capacitor C1. As the input line voltage passes through the level of the voltage stored on C1, then C1 begins to charge following that line voltage. This prevents the capacitor to be suddenly connected to a source that is at a very different potential than the capacitor current charge level. The capacitor is therefore charged with minimum power dissipation, hence adiabatically or quasi-adiabatically. During the charging time of C1, the slope of the rectified input voltage signal is positive.

The time duration t2−t1 is approximately equal to a half cycle of the AC source voltage. During this time, S2 is open, therefore the input line is disconnected from the load, hence preventing EMI from propagating from the load to the source.

At time t=t2, also referred to as the transition time, the logic signal Ph_A 650 changes from high to low, for example from a logic 1 to a logic 0. The switches S1 and S4 are turned off (open). The adiabatic protection circuit is in the third mode.

A close up around time t2 is shown in FIG. 7. The transition time t2 occurs between two consecutive current pulses of the switching regulator, hence during an off-time $T_{OFF}$ of a switching cycle of the switching regulator. Since the transition between the first mode and the second mode occurs during $T_{OFF}$, there is no disruption or interruption of power available from the converter during the on time. Between t=t2 and t=t2+delay, both the logic signals Ph_A and Ph_B are low. During this delay time all switches are turned off (open).

The delay is chosen to be long enough to ensure that the switches are fully turned off, but short enough so as to not interfere with the next pulse of the switching cycle. The delay time can range between about $$\frac{TOFF}{100} \text{ and } \frac{TOFF}{10}.$$

For instance, a suitable delay could range from a few hundred of nanoseconds to about a microsecond. For example, between about 0.5 µs to approximately 1 µs. The time delay allows the capacitors C1 and C2 to remain disconnected from each other at all time. In other words, C1 and C2 are never connected together in parallel at any time. This prevents a sudden charge or discharge of these capacitors which would result in a significant power dissipation of the system.

At time t2+delay, the logic signal Ph_B 660 changes from low to high while the logic signal Ph_A 650 remains low. The switches S2 and S3 are turned on (closed) allowing charging of capacitor C2 through the rectifier and discharge of capacitor C1 through the load. Signal 630 shows that the voltage across C1 is decreasing. The adiabatic protection circuit is in the second mode.

Between t2 and t3 the voltage of C2, 640 remains constant. During this time the rectified voltage 690 is increasing. At time t3 the rectified voltage has reached a value lower or equal to the voltage across C2.

At time t=t3, the capacitor C2 starts charging. Therefore, capacitor C2 charges at a point in time when the rectified input voltage 690 is increasing, before or when the rectified input voltage reaches a value equal to the voltage across C2. Before t=t3 the four diodes of the rectifier are reversed biased. Therefore, there is no current flowing from the input line before the input line has reached the voltage across the capacitor C2. As the input line voltage passes through the level of the voltage stored on C2, then C2 begins to charge following that line voltage. The capacitor is therefore charged with minimum power dissipation, hence adiabatically or quasi-adiabatically. During charging of C2, the slope of the rectified input voltage signal 690 is positive.

The time duration t4−t2 is approximately equal to a half cycle of the AC source voltage. During this time, S4 is open, therefore the input line is disconnected from the load, hence preventing EMI from propagating from the load to the source.

At time t=t4 the logic signal Ph_B 660 changes from high to low. The switches S2 and S3 are turned off (open). The logic signal Ph_A remains low. As for t2, the transition time t4 is chosen to occur between two consecutive current pulses of the switching regulator, hence during an off-time $T_{OFF}$ of a switching cycle of the switching regulator. The adiabatic protection circuit is in the third mode.

At time t=t4+delay, the logic signal Ph_A 650 changes from low to high. The switches S1 and S4 are turned on. This is the end of the cycle and the start of the next cycle. The delay is chosen to be long enough to ensure that the switches are fully turned off, but short enough so as to not interfere with the next pulse of the switching cycle.

The adiabatic system is operated between the first mode and the second mode cyclically. Between t1 and t2 the adiabatic system is in the first mode in which the load is driven by C2. Between t2+delay and t4, the adiabatic system is in the second mode in which the load is driven by C1. The adiabatic system switches between the first mode and the second mode via the third mode, also referred to as intermediate mode, in which all the switches are open. In this way, the adiabatic system isolates the input line from the switching regulator. This prevents interferences produced at the load to be communicated to the source. No switching current occurs on the input current signal 680, as shown by the flat line in FIG. 7.

As shown above the capacitor of the adiabatic system, C1 or C2, is charged at a time when the rectified input voltage 690 is increasing, before the rectified input voltage reaches a value equal to the voltage across capacitor. This prevents power dissipation. Therefore, the present circuit is designed to block EMI without reducing efficiency.

Figure 8:
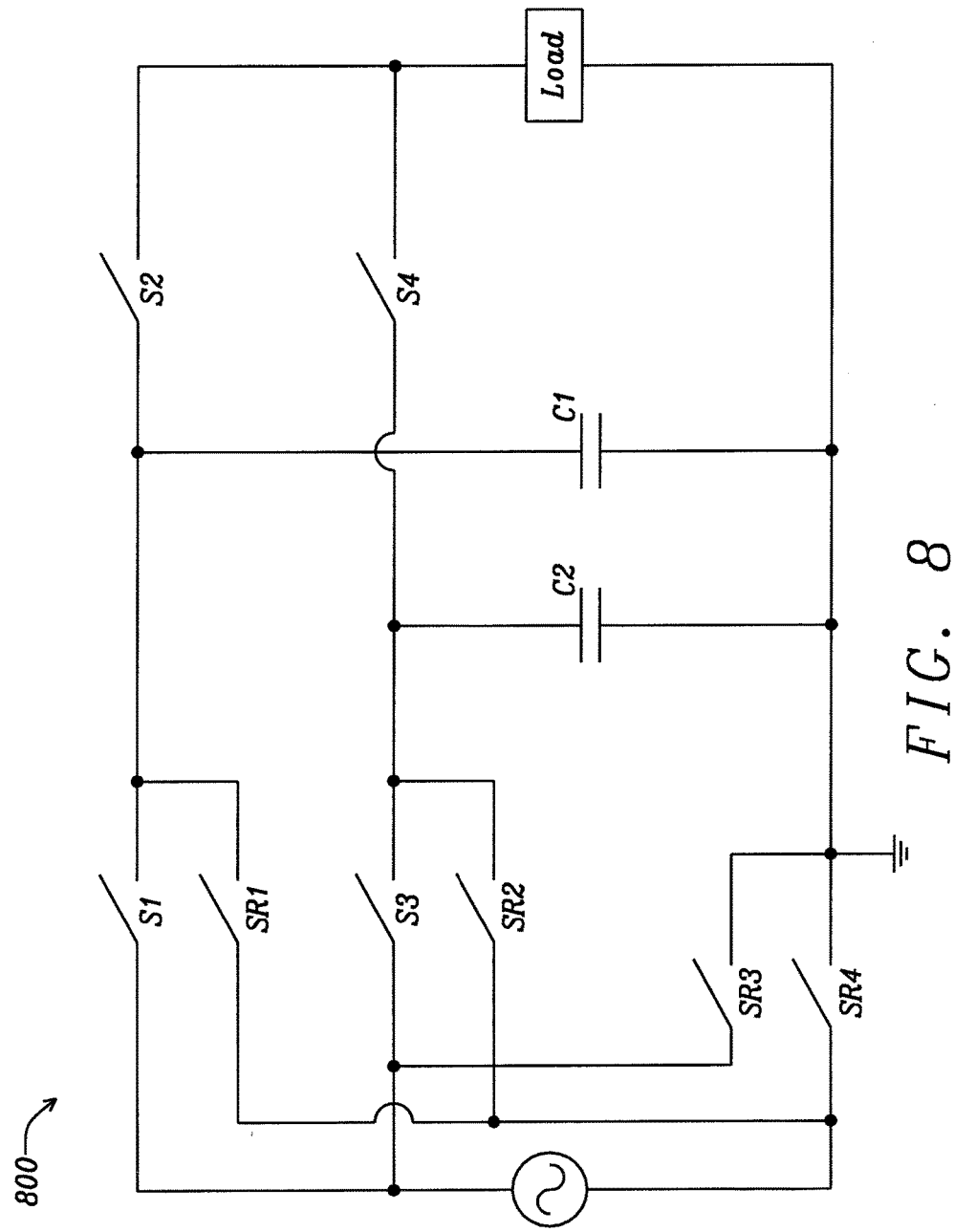
FIG. 8 is another circuit diagram of a power converter provided with an adiabatic EMI blocking system.

FIG. 8 illustrates another embodiment of the circuit of FIG. 4. In this case, the rectifier is provided by four switches, SR1, SR2, SR3, SR4, for example four transistors, forming a synchronous rectifier. Using this embodiment, power dissipation can be further improved. This is in part due to the fact that the switches of the synchronous rectifier do not display a voltage drop. In an alternatively embodiment, the rectifier may be provided by two diodes and two switches.

The switching regulator load is provided with a power switch. In the circuit of FIG. 4 and FIG. 8, the power switch can be an additional switch. Alternatively, one of the switch S2 or S4, could be used as the power switch for the switching regulator, hence simplifying circuit design.

A skilled person will appreciate that variations of the disclosed arrangements are possible without departing from the disclosure. Accordingly, the above description of the specific embodiment is made by way of example only and not for the purposes of limitation. It will be clear to the skilled person that minor modifications may be made without significant changes to the operation described.

What is claimed is:

1. An adiabatically-switched electromagnetic interference protection circuit comprising:
    a first charge storage element and a second charge storage element, the first and second charge storage elements being provided between an input for receiving a rectified input voltage and an output for connecting to a switching regulator;
        wherein the protection circuit is selectively operable between a first mode in which the first charge storage element is coupled to the input and de-coupled from the output; a second mode in which the second charge storage element is coupled to the input and de-coupled from the output; and a third mode in which the first charge storage element and the second charge storage element are each de-coupled from both the input and the output and
    a controller adapted to output a control signal to switch the protection circuit between the first mode and the second mode via the third mode; wherein the control signal is adapted to maintain the protection circuit in the third mode for a delay-time.

2. The protection circuit as claimed in claim 1, wherein the switching regulator is configured to operate with a switching cycle having an on-time and an off-time; and wherein the control signal is arranged to cause a transition between the first mode and the second mode to start during the off-time of a switching cycle of the switching regulator.

3. The protection circuit as claimed in claim 1, wherein the control signal is arranged to cause a transition between the first mode and the second mode to start during a period of time when the rectified input voltage is increasing.

4. The protection circuit as claimed in claim 1, wherein the control signal comprises a plurality of logic signals.

5. The protection circuit as claimed in claim 1, comprising a first pair of switches coupled to the first and second charge storage elements and a second pair of switches coupled to the first and second charge storage elements.

6. The protection circuit as claimed in claim 5, wherein the control signal comprises a first logic signal adapted to operate the first pair of switches and a second logic signal adapted to operate the second pair of switches.

7. The protection circuit as claimed in claim 5, wherein the first pair of switches comprises a first switch coupled between the input of the protection circuit and the first charge storage element; and a second switch coupled between the second charge storage element and the output of the protection circuit; and
    wherein the second pair of switches comprises a third switch coupled between the input of the protection circuit and the second charge storage element; and a fourth switch coupled between the first charge storage element and the output of the protection circuit.

8. The protection circuit as claimed in claim 1, wherein the controller comprises a time-delay circuit coupled to a plurality of logic gates.

9. The protection circuit as claimed in claim 1, wherein the delay-time ranges for from about 0.5 microsecond to about 1 microsecond.

10. A converter circuit comprising
    a rectifier for providing a rectified input voltage,
    a switching regulator comprising a power switch; and
    an adiabatically-switched electromagnetic interference protection circuit coupled to the rectifier and to the switching regulator; wherein the protection circuit comprises
    a first charge storage element and a second charge storage element, the first and second charge storage elements being provided between an input for receiving the rectified input voltage and an output for connecting to the switching regulator;
    wherein the protection circuit is selectively operable between a first mode in which the first charge storage element is coupled to the input and de-coupled from the output; a second mode in which the second charge storage element is coupled to the input and de-coupled from the output; and a third mode in which the first charge storage element and the second charge storage element are each de-coupled from both the input and the output and a controller adapted to output a control signal to switch the protection circuit between the first mode and the second mode via the third mode; wherein the control signal is adapted to maintain the protection circuit in the third mode for a delay-time.

11. The converter circuit as claimed in claim 10, wherein the rectifier comprises at least two switches.

12. The converter circuit as claimed in claim 10, wherein the protection circuit comprises a first pair of switches coupled to the first and second charge storage elements and a second pair of switches coupled to the first and second charge storage elements; and wherein one switch among the first and second pair of switches is the power switch of the switching regulator.

13. An electromagnetic interferences protection method comprising the steps of:

providing an adiabatically-switched electromagnetic interference protection circuit comprising a first charge storage element and a second charge storage element between an input for receiving a rectified input voltage and an output for connecting to a switching regulator; wherein the protection circuit is selectively operable between a first mode in which the first charge storage element is coupled to the input and de-coupled from the output; a second mode in which the second charge storage element is coupled to the input and de-coupled from the output; and a third mode in which the first charge storage element and the second charge storage element are each de-coupled from both the input and the output; and switching the protection circuit between the first mode and the second mode via the third mode by maintaining the protection circuit in the third mode for a delay-time.

14. The method as claimed in claim 13, wherein the switching regulator is configured to operate with a switching cycle having an on-time and an off-time; and wherein switching the protection circuit between the first state and the second state is performed during the off-time of a switching cycle of the switching regulator.

15. The method as claimed in claim 13, wherein switching the protection circuit between the first mode and the second mode starts during a period of time when the rectified input voltage is increasing.

16. The method as claimed in claim 13 further comprising the steps of: charging the first charge storage element in the first mode and discharging the first charge storage element in the second mode.

17. The method as claimed in claim 13 further comprising the steps of: charging the second charge storage element in the second mode and discharging the second charge storage element in the first mode.

18. The method as claimed in claim 16, wherein charging the storage element is started when the rectified input voltage reaches a value equal to the voltage across the capacitor.

19. The method as claimed in claim 13, further comprising the step of: providing a first pair of switches coupled to the first and second charge storage elements and a second pair of switches coupled to the first and second charge storage elements.

20. The method as claimed in claim 19, further comprising the steps of: generating a first logic signal to control the first pair of switches and generating a second logic signal to control the second pair of switches.

* * * * *